(12) United States Patent
Koyama et al.

(10) Patent No.: US 12,316,644 B2
(45) Date of Patent: May 27, 2025

(54) COMMUNICATION APPARATUS, EXTERNAL APPARATUS, COMMUNICATION SYSTEM, COMMUNICATION METHOD AND PROGRAM

(71) Applicant: NIPPON TELEGRAPH AND TELEPHONE CORPORATION, Tokyo (JP)

(72) Inventors: Takuma Koyama, Tokyo (JP); Masashi Tanaka, Tokyo (JP); Yasushi Okano, Tokyo (JP); Masaru Matsubayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 391 days.

(21) Appl. No.: 17/799,217

(22) PCT Filed: Feb. 26, 2020

(86) PCT No.: PCT/JP2020/007572
§ 371 (c)(1),
(2) Date: Aug. 11, 2022

(87) PCT Pub. No.: WO2021/171390
PCT Pub. Date: Sep. 2, 2021

(65) Prior Publication Data
US 2023/0070007 A1    Mar. 9, 2023

(51) Int. Cl.
*H04L 9/40* (2022.01)
*G16Y 10/40* (2020.01)
(Continued)

(52) U.S. Cl.
CPC ............ *H04L 63/107* (2013.01); *G16Y 10/40* (2020.01); *G16Y 30/10* (2020.01); *H04L 43/022* (2013.01);
(Continued)

(58) Field of Classification Search
CPC . H04L 63/12; H04L 63/1408; H04L 63/1425; H04L 63/30; H04L 43/022
See application file for complete search history.

(56) References Cited

U.S. PATENT DOCUMENTS

2016/0205194 A1* 7/2016 Kishikawa ............ H04L 67/12
   726/1
2016/0226841 A1* 8/2016 Linnakangas ........... G06F 16/00
(Continued)

OTHER PUBLICATIONS

Sasaki et al. (2017) "Shasai-muke Security System No. Unyou Cost WO Sakugen-suru Kanshi Data-ryou Sakugen Houshiki" in Japanese (can be translated as "Monitoring Data Reduction Method for Reducing Operational Cost of In-Vehicle Security System"), Symposium on Cryptography and Information Security (SCIS), Jan. 17, 2017.

*Primary Examiner* — Eric W Shepperd

(57) ABSTRACT

Provided is a communication apparatus communicating with an external apparatus connected via a network, and the communication apparatus includes a processor and a memory storing program instructions that cause the processor to: calculate a communication interval of data communicated within the communication apparatus; determine whether to perform communication with the external apparatus based on whether the communication interval is within a range set in advance; and transmit, to the external apparatus, communication data including the communication interval determined to perform communication with the external apparatus, latter data in the communication interval, and a transition between former data and the latter data in the
(Continued)

communication interval, so that traffic from an apparatus to outside is reduced while suppressing deterioration in detection accuracy of unauthorized communication.

9 Claims, 13 Drawing Sheets

(51) Int. Cl.
*G16Y 30/10* (2020.01)
*H04L 43/022* (2022.01)
*H04L 43/106* (2022.01)

(52) U.S. Cl.
CPC ........ *H04L 43/106* (2013.01); *H04L 63/1425* (2013.01)

(56) References Cited

U.S. PATENT DOCUMENTS

| | | | |
|---|---|---|---|
| 2016/0381059 A1* | 12/2016 | Galula | H04L 63/02 726/23 |
| 2018/0308295 A1* | 10/2018 | Kwak | G06F 9/453 |
| 2018/0316584 A1* | 11/2018 | Ujiie | H04L 43/0823 |
| 2021/0192867 A1* | 6/2021 | Fang | G07C 5/0808 |
| 2021/0226872 A1* | 7/2021 | Ujiie | H04W 12/61 |
| 2021/0337387 A1* | 10/2021 | Ueno | H04W 12/122 |
| 2022/0385680 A1* | 12/2022 | Felke | G05B 23/0283 |
| 2023/0342166 A1* | 10/2023 | DeNeui | G06F 9/451 |
| 2024/0259399 A1* | 8/2024 | Naka | B60R 16/02 |

* cited by examiner

Fig. 4

| CAN-ID | COMMUNICATION INTERVAL LOWER LIMIT [msec] | COMMUNICATION INTERVAL UPPER LIMIT [msec] | DETERMINATION PAYLOAD POSITION (Byte unit) | TRANSMISSION PAYLOAD POSITION (Byte unit) | UPLOAD PERIOD [msec] |
|---|---|---|---|---|---|
| A | 210 | 220 | 11111111 | 01010110 | 2000 |
| B | 1,990 | 2,010 | 01100 | 01100 | 10,000 |
| C | 130 | 150 | 01 | 11 | 2000 |

| CAN-ID | TIMING INFORMATION [msec] | | | | | | |
|---|---|---|---|---|---|---|---|
| | RECEPTION TIME [msec] | COMMUNICATION INTERVAL [msec] | PAYLOAD | TRANSITION | RECEPTION TIME [msec] | COMMUNICATION INTERVAL [msec] | PAYLOAD | TRANSITION |
| A | 110 | 5 | 0x00000000 | 0x00A0F001 | 140 | 20 | 0xAEB0DF60 | 0x00000060 |
| B | | | | | | | | |
| C | 153 | 120 | 0xFFAD | 0xFF00 | | | | |

Fig. 9

| CAN-ID | TIMING INFORMATION [msec] | | | | | |
|---|---|---|---|---|---|---|
| | 100 | | | | | |
| | COUNTER | PAYLOAD | TRANSITION | COUNTER | TRANSITION | COUNTER |
| A | 10 | 0x00000000 | 0x00A0F001 | 3 | 0x00000060 | 7 |
| B | 3 | | | | | |
| C | 1 | 0xFFAD | 0xFF00 | 1 | | |

COMMUNICATION APPARATUS, EXTERNAL APPARATUS, COMMUNICATION SYSTEM, COMMUNICATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/007572, filed on 26 Feb. 2020, the disclosure of which is hereby incorporated herein by reference in its entirety.

TECHNICAL FIELD

The present invention relates to a communication apparatus, an external apparatus, a communication system, a communication method, and a program.

BACKGROUND ART

As for Internet of Things (IoT) devices represented by mobile bodies such as automobiles, trains, airplanes, ships, drones and the like as well as agricultural sensor networks, various kinds of functions and mechanisms of such an IoT device are electronically controlled by a set of electronic control devices (referred to as electronic control units (ECUs) in automobiles) and the electronic control device hereinafter will be referred to as "ECU" regardless of the types of the IoT devices).

Data carried by each ECU is shared by other ECUs through communication via the internal network of the IoT device. This makes it possible to implement advanced control as the entire IoT device.

It is pointed out that malicious parties may intrude the internal network of the IoT device directly or via an external network and launch attacks such as interception of the communication content, spoofing, jamming, and the like so that the security, assets, and privacy of the IoT device itself, the user of the IoT device, those who provide the IoT device, services by the IoT device and the like may be violated. Therefore, there is an increasing demand for monitoring and analyzing the communication in the internal network of the IoT device for the security purpose.

In the meantime, there is also an increasing demand for enabling the device or the user of the device to receive various services from an external device by providing the communication flowing in the internal network of the IoT device to an external server (external device).

However, as the general characteristics of the internal network of the IoT device, there are (1) a vast amount of data is communicated between ECUs as needed and (2) a large number of such devices. Therefore, an increase in the communication load is concerned if the communication on the internal networks of the IoT devices is simply provided as it is to the external device.

Note that Controller Area Network (CAN) is broadly used as a communication protocol of the internal networks of the IoT devices.

As a technique for transmitting data on an internal network of an IoT device (automobile) to an external device and using it for security analysis, a technique described in Non-Patent Literature 1 is known, for example. As the methods for transmitting data to the external device, Non-Patent Literature 1 proposes a technique that utilizes three methods that include monitoring target optimization, sampling, and application of compression algorithm.

"Monitoring target optimization" is a technique for monitoring only highly important data frames. For example, assuming a case where one hundred kinds of data flow in CAN and twenty kinds of the data are directly associated with behavior of the vehicle, monitoring data amount can be reduced by about 80% by performing monitoring target optimization provided that each data has the same data amount.

"Sampling" is a technique that takes, as the monitoring data, not the whole CAN logs but a part of the CAN logs that are sampled. CAN data of S seconds is acquired during a sampling interval of T seconds to be taken as the monitoring data.

"Application of compression algorithm" is a technique for reducing the data amount by applying a lossless data compression algorithm to the monitoring data, such as zip, gzip, or 7-Zip.

Logs to which the three methods are applied are called sampling logs, while logs to which the three methods are not applied are called full logs. Sampling logs are transmitted at normal time, while full logs are transmitted to the external device when a security monitor separately loaded within the device issues an anomaly alert.

CITATION LIST

Non-Patent Literature

Non-Patent Literature 1: Takamitsu SASAKI, Ryota TAKAHASHI, Jyunichi TSURUMI, Takeshi KISHIKAWA, Tomoyuki HAGA, Hideki MATSUSHIMA, "Shasai-muke Security System no Unyou Cost wo Sakugen-suru Kanshi Data-ryou Sakugen Houshiki" in Japanese (can be translated as "Monitoring Data Reduction Method for Reducing Operational Cost of In-Vehicle Security System"), Symposium on Cryptography and Information Security (SCIS) 2017, 17 Jan. 2017

SUMMARY OF THE INVENTION

Technical Problem

With the existing technique described above, however, information regarding communication of the functions that are not the monitoring target and regarding communication out of the sampling time (T-S seconds for every T seconds) is not transmitted to the external device at all. That is, there are following two issues in the existing technique.

(A) Only the communication regarding a part of the control functions is transmitted, so that the entire internal network of an IoT device cannot be monitored.

(B) For sampling, it is stochastic that unauthorized communication by an attack is transmitted to an external device.

Therefore, with the existing technique, the detection rate by the external device is low in regards to the attacks on the internal network of the IoT device.

The present invention is designed in view of the foregoing issues, and it is an object thereof to reduce the traffic from the device to outside while suppressing deterioration in the detection accuracy of unauthorized communication.

Means for Solving the Problem

In order to overcome the foregoing issues, the communication apparatus is a communication apparatus communicating with an external apparatus connected via a network, and the communication apparatus includes a processor and a memory storing program instructions that cause the processor to: calculate a communication interval of data communicated within the communication apparatus; determine whether to perform communication with the external apparatus based on whether the communication interval is within a range set in advance; and transmit, to the external apparatus, communication data including the communication interval determined to perform communication with the external apparatus, latter data in the communication interval, and a transition between former data and the latter data in the communication interval.

Effects of the Invention

It is possible to reduce the traffic from the device to outside while suppressing deterioration in the detection accuracy of unauthorized communication.

BRIEF DESCRIPTION OF DRAWINGS

FIG. 4 is a table indicating a configuration example of a rule storage unit 122.

FIG. 5 is a chart illustrating an example of communication data according to the first embodiment.

FIG. 9 is a chart illustrating an example of communication data according to a second embodiment.

DESCRIPTION OF EMBODIMENTS

Figure 1:
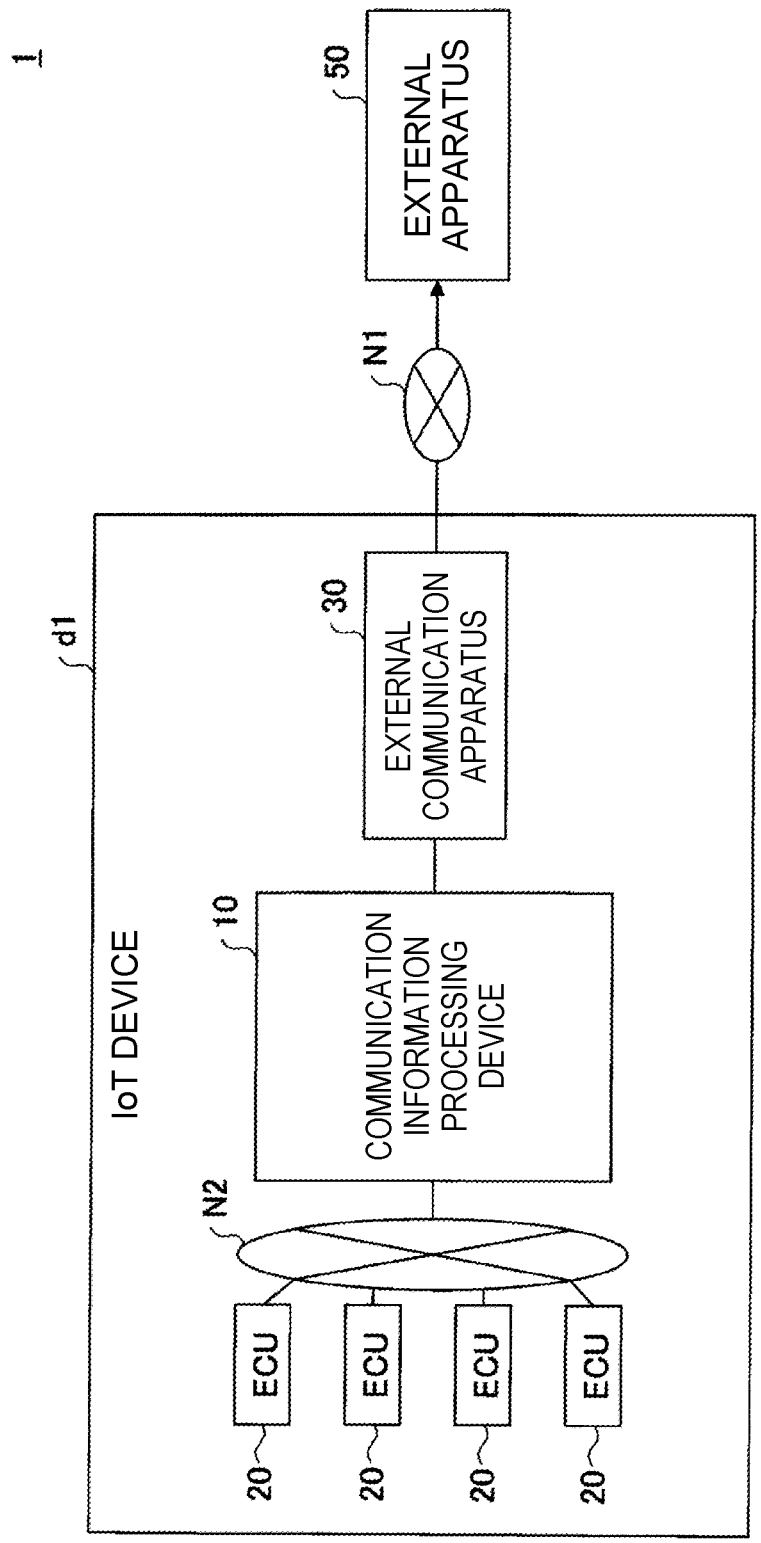
FIG. 1 is a diagram illustrating a configuration example of a communication system 1 according to a first embodiment.

Hereinafter, embodiments of the present invention will be described with reference to the accompanying drawings. FIG. 1 is a diagram illustrating a configuration example of a communication system 1 according to a first embodiment. In FIG. 1, an IoT device and an external apparatus 50 are connected via an external network N1. The external network N1 may include a wireless communication network such as a mobile communication network.

An IoT device d1 is an Internet of Things (IoT) device represented by a mobile body such as an automobile, trains, an airplane, a ship, a drone or the like as well as an agricultural sensor network. While assumed in the embodiment is a case where the IoT device is an automobile, it is also possible to apply the embodiment to other types of IoT devices.

In FIG. 1, the IoT device d1 includes hardware such as a plurality of ECUs 20, an in-device network N2, a communication information processing device 10, an external communication apparatus 30, and the like. The plurality of ECUs 20 and the communication information processing device 10 are connected via the in-device network N2.

The ECU 20 is an example of an electronic control device that electronically controls various kinds of functions and mechanisms of the IoT device d1. Each of the ECUs 20 mutually transmits and receives messages (referred to as "in-device messages" hereinafter) by performing Controller Area Network (CAN) communication via the in-device network N2. While the embodiment is described by referring to a case of CAN communication, the embodiment can be applied to other communication protocols and in-device networks having such communication characteristics that, when a communication group is classified according to header information or the like (CAN-IDs in the case of CAN communication), each thereof has periodicity in communication intervals or that the periodicity changes in accordance with a change in a specific value of a payload.

The communication information processing device 10 is a device (computer) that controls transmission of information for the external apparatus 50 indicating a change (information) on the in-device network N2 caused due to an attack for the in-device network N2. The communication information processing device 10 regularly processes and compresses information regarding the in-device messages (referred to as "CAN data" hereinafter). Specifically, the communication intervals and transition of the payload are both monitored for each CAN-ID (≈function), and processed CAN data (referred to as "communication data" hereinafter) is transmitted to the external apparatus 50 according to the condition attributable to the information. Note that the processing means processing for rewriting or adding information or processing for reducing the data amount such as extracting a part of the payload.

The external apparatus 50 is one or more computers that, upon receiving communication data, applies an analyzer and an attack detector corresponding to the processing method to the communication data to determine whether there is an attack on the in-device network N2.

A normal state (unattacked state) of the in-device network N2 is a state where the communication intervals are almost constant for each CAN-ID or a state where the transition pattern of the payload matches the pattern condition defined in advance. Thus, by properly designing the conditions for each CAN-ID regarding whether there is an excess of the upper and lower limit values of the communication interval that may occur in the normal state and regarding whether there is a change in the payload, it becomes highly possible that state of the in-device network N2 deviates from the conditions when there is an attack and that the communication data transmitted to the external apparatus 50 includes information regarding the attack. As a result, the external apparatus 50 upon receiving the communication data can analyze and detect the attack. Furthermore, when the IoT device d1 is in a normal state, the majority of communication does not meet the above conditions. Therefore, a considerable amount of communication data transmitted to the external apparatus 50 is reduced, thereby making it possible to reduce the communication load.

The external communication apparatus 30 is an apparatus that transmits CAN data (communication data) processed by the communication information processing device 10 to the external apparatus 50.

Figure 2:
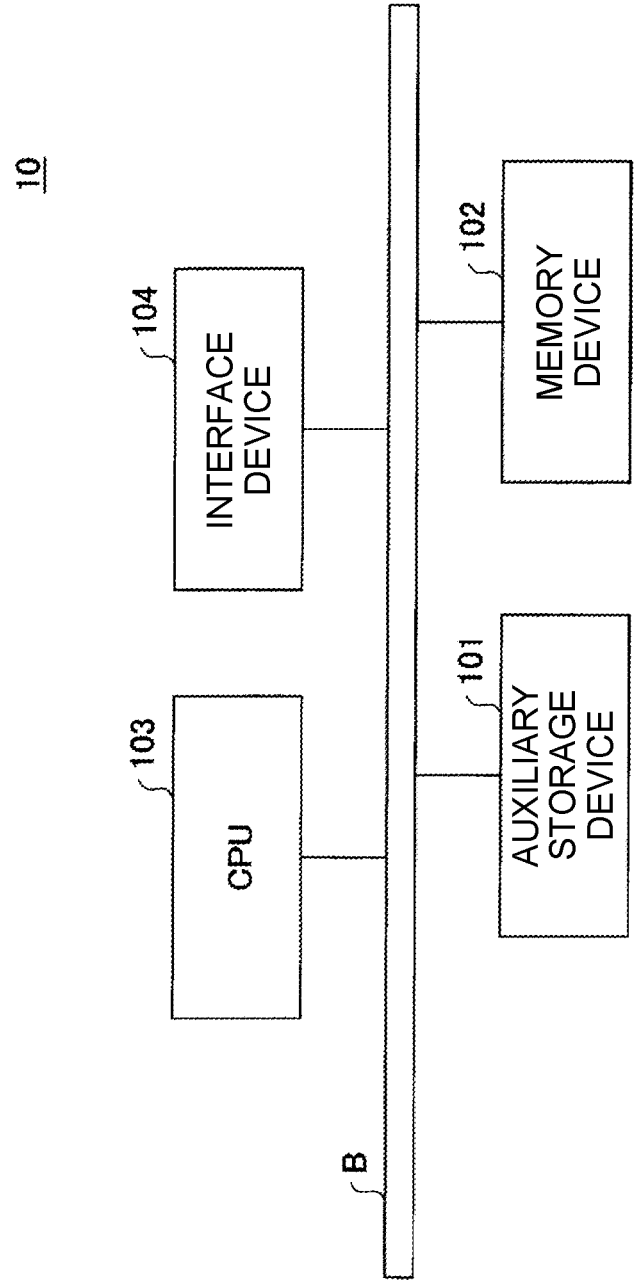
FIG. 2 is a diagram illustrating a hardware configuration example of a communication information processing device 10 according to the first embodiment.

FIG. 2 is a diagram illustrating a hardware configuration example of the communication information processing device 10 according to the first embodiment. The communication information processing device 10 in FIG. 2 includes an auxiliary storage device 101, a memory device 102, a Central Processing Unit (CPU) 103, an interface device 104, and the like connected mutually via a bus B.

A program implementing the processing of the communication information processing device 10 is installed in the auxiliary storage device 101. The auxiliary storage device 101 stores the installed program and also stores necessary files, data, and the like.

The memory device 102 reads out and stores the program from the auxiliary storage device 101, when there is an instruction to start the program. The CPU 103 executes functions related to the communication information processing device 10 according to the program stored in the memory device 102. The interface device 104 is used as an interface for connecting to the in-device network N2 and the external communication apparatus 30.

Note that the external apparatus 50 may also have the same hardware configuration. In that case, the interface device of the external apparatus 50 is used as the interface for connecting to the external network N1.

Figure 3:
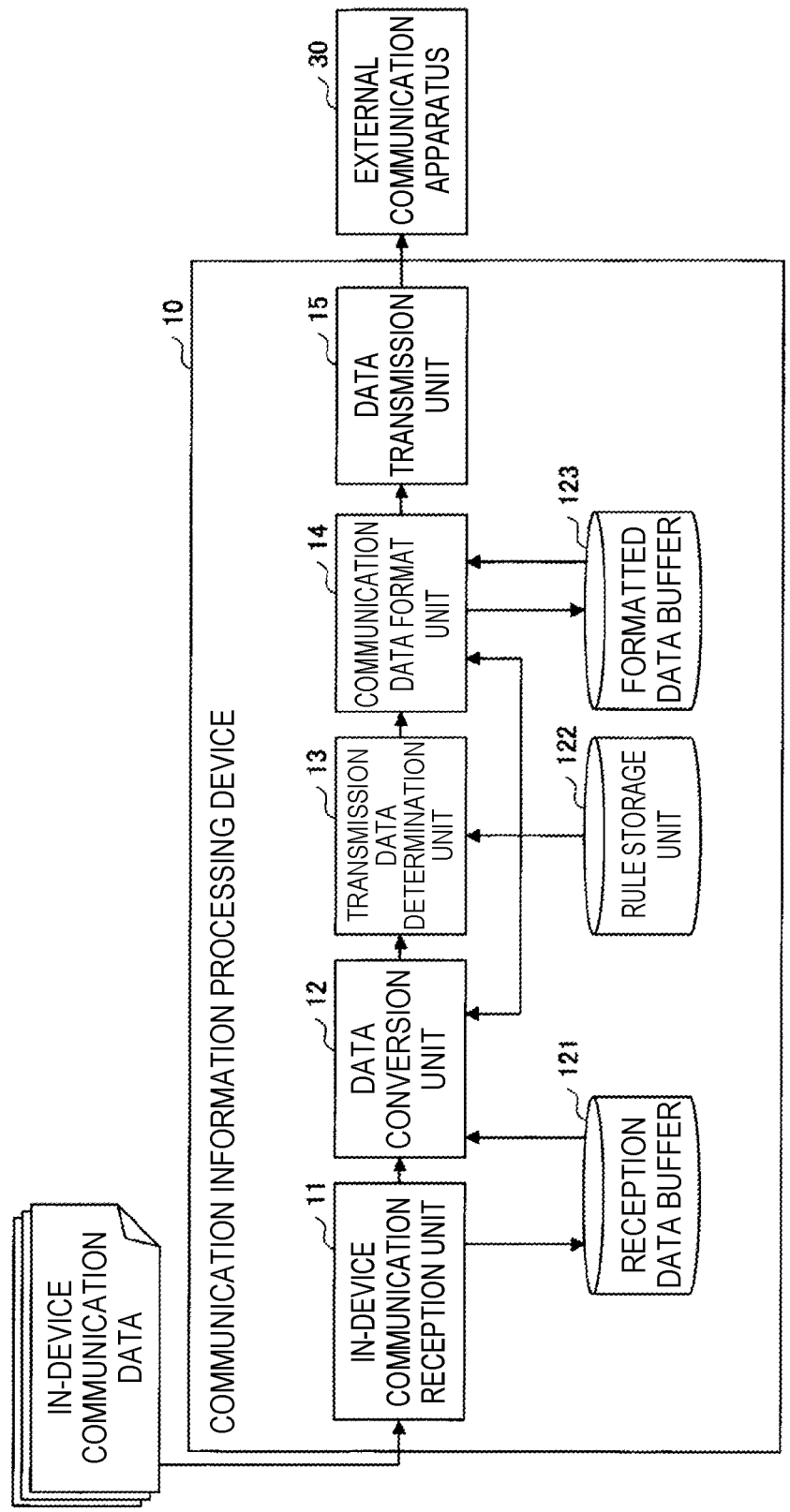
FIG. 3 is a diagram for describing a functional configuration example of the communication information processing device 10 and processing executed by the communication information processing device 10 according to the first embodiment.

FIG. 3 is a diagram for describing a functional configuration example of the communication information processing device 10 and the processing executed by the communication information processing device 10 according to the first embodiment. In FIG. 3, the communication information processing device 10 includes an in-device communication reception unit 11, a data conversion unit 12, a transmission data determination unit 13, a communication data format unit 14, a data transmission unit 15, and the like. Each of those units is implemented by the processing executed by the CPU 103 by one or more programs installed in the communication information processing device 10. The communication information processing device 10 also uses storage units such as a reception data buffer 121, a rule storage unit 122, a formatted data buffer 123, and the like. Each of those storage units can be implemented by using the auxiliary storage device 101, the memory device 102, or the like, for example.

The in-device communication reception unit 11 at any time receives in-device messages input to the communication information processing device 10 from the in-device network N2, and records the CAN data extracted from the in-device message to the reception data buffer 121.

In the reception data buffer 121, each piece of information regarding the latest CAN data and the CAN data received right before is saved for each CAN-ID.

With CAN, the reception time is not included in the message. Therefore, the in-device communication reception unit 11 gives the reception time of the in-device message to the CAN data and records data including "CAN-ID, reception time, payload (of in-device message)" in the reception data buffer 121 as the CAN data. Thereafter, the in-device communication reception unit 11 notifies the data conversion unit 12 that the in-device message is received. The notification includes the CAN-ID (referred to as "target CAN-ID" hereinafter) extracted from the in-device message.

The data conversion unit 12 extracts the rule from the rule storage unit 122 in response to the notification from the in-device communication reception unit 11. Note, however, that the data conversion unit 12 may extract the rule in advance only once at the time of startup or the like of the IoT device d1. In that case, it is not necessary to extract the rule every time the notification is received.

FIG. 4 is a table indicating a configuration example of the rule storage unit 122. As illustrated in FIG. 4, the rule storage unit 122 stores the rule for each CAN-ID (classified by each CAN-ID). Each of the rules includes "communication interval lower limit", "communication interval upper limit", "determination payload position", "transmission payload position", "upload period", and the like. Note that FIG. 4 is an example of a case where communication under three kinds of CAN-IDs is performed in the in-device network N2.

Note that "communication interval lower limit" and "communication interval upper limit" indicate the range of a normal communication interval. That is, "communication interval lower limit" indicates the lower limit of the normal communication interval, while "communication interval upper limit" indicates the upper limit of the normal communication interval. Note that "determination payload position" indicates the portion used for calculation of transition (change) of the payload in a byte unit of the payload. That is, in the rule, the payload is expressed in a unit of 1 byte from 1 to 8. FIG. 4 indicates an example where the payload length is fixed for each of the CAN-IDs, and it is 8 bytes in "A", 5 bytes in "B" is, and 2 bytes in "C". In "determination payload position", it is indicated that the value of payload position (byte) corresponding to the value "1" is used for calculation of the payload transition, and that the value of the payload position (byte) corresponding to the value "0" is not used for calculation of payload transition.

Note that "transmission payload position" indicates the portion of the payload to be the transmission target with the byte unit of the payload. It is indicated that the payload position (byte) with the value "1" is the transmission target and the value thereof is transmitted, and that the value of the payload position (byte) with the value "0" is not the transmission target. Note that "determination payload position" and "transmission payload position" are not necessarily in a byte unit but may be designated by a bit unit.

Note that "upload period" indicates a specific period with which the communication data format unit 14 regularly updates the transmission payload position and the like. While FIG. 4 presents the example where the upload period is longer than the communication intervals (communication interval upper limit and communication interval lower limit) of all of the CAN-IDs, it is also possible to set a rule in which the upload period is equal to or shorter than the communication intervals.

Subsequently, the data conversion unit 12 extracts from the reception data buffer 121 two CAN data pieces corresponding to the target CAN-ID, which are the latest CAN data and the CAN data right before, and calculates the communication interval of the two CAN data pieces and the payload transition. The communication interval can be calculated by the difference of the reception time included in the two CAN data pieces (the reception time of the latter CAN data related to the communication interval—the reception time of the former CAN data related to the communication interval). The payload transition is the value (that is, exclusive OR difference) calculated by performing exclusive OR operation (XOR) or subtraction of the payloads of the two CAN data pieces regarding the payload portions corresponding to "1" under the rule corresponding to the target CAN-ID (referred to as "target rule" hereinafter). In a case of subtraction, the payload of the CAN data right before is subtracted from the payload of the latest CAN data. The data conversion unit 12 transmits "CAN-ID, reception time, communication interval, latest payload, payload transition" to the transmission data determination unit 13 as the calculation result (referred to as "converted data" hereinafter). Note here that the reception time is the reception time of the latest CAN data. The latest payload is the payload of the latest CAN data.

Upon receiving the converted data acquired by the data conversion unit 12, the transmission data determination unit 13 compares "communication interval lower limit" and "communication interval upper limit" of the target rule with the communication interval of the converted data to determine whether the converted data is the data to be transmitted to the external apparatus 50, and transmits the determination result to the communication data format unit 14. When the determination result is positive, the converted data is also included in the determination result. Specifically, when the communication interval is out of the range defined by "communication interval lower limit" and "communication interval upper limit" of the target rule, the transmission data determination unit 13 determines to transmit the calculation result to the external apparatus 50. Then, the transmission data determination unit 13 transmits {CAN-ID, Yes, [reception time, communication interval, latest payload, payload transition]}, for example, to the communication data format unit 14 as the determination result. In the meantime, when communication interval is within the range defined by "communication interval lower limit" and "communication interval upper limit" of the target rule, the transmission data determination unit 13 determines not to transmit the calculation result to the external apparatus 50. Then, the transmission data determination unit 13 transmits {CAN-ID, No}, for example, to the communication data format unit 14 as the determination result.

Upon receiving the determination result, the communication data format unit 14 extracts all of the rules from the rule storage unit 122. Note, however, that the communication data format unit 14 may extract the rule in advance only once at the time of startup or the like of the IoT device d1.

Subsequently, in accordance with Yes/No of the received determination result, the formatted data buffer 123 is updated. In the formatted data buffer 123, an area is secured for each CAN-ID. When the determination result is Yes, the communication data format unit 14 stores the converted data (reception time, communication interval, latest payload, payload transition) included in the determination result in the area corresponding to the target CAN-ID in the formatted data buffer 123. In the meantime, when the determination result is No, the communication data format unit 14 does not update the formatted data buffer 123. When it is designated in the target rule that "transmission payload position" is partial, the communication data format unit 14 may store only the corresponding portion of the payload to the formatted data buffer 123 for the payload included in the converted data when updating the buffer.

The communication data format unit 14 also has a timer and, every time there comes the timing of "upload period" included in each of the rules, checks whether the converted data is stored in the formatted data buffer 123 for all of the CAN-IDs corresponding to that timing. When the converted data is stored, the communication data format unit 14 transmits, to the data transmission unit 15, the data (referred to as "communication data" hereinafter) acquired by giving timing information (elapsed time from the previous transmission) to the converted data. The communication data format unit 14 deletes the calculation result regarding the communication data transmitted to the data transmission unit 15 from the formatted data buffer 123.

FIG. 5 is a chart illustrating an example of the communication data according to the first embodiment. In FIG. 5, three kinds of CAN-IDs (A, B, C) are the monitoring target, and presented therein is an example of the communication data in a case where the number of times the range of the upper limit and lower limit of the communication interval is exceeded is "2" in "A", "0" in "B", and "1" in "C", respectively, at the timing where 100 msec has passed from the previous transmission.

The data transmission unit 15 at any time transmits the communication data received from the communication data format unit 14 to the external communication apparatus 30.

The external communication apparatus 30 transmits the communication data to the external apparatus 50 at any time upon receiving the communication data, when stability of external communication is confirmed, or regularly.

Figure 6:
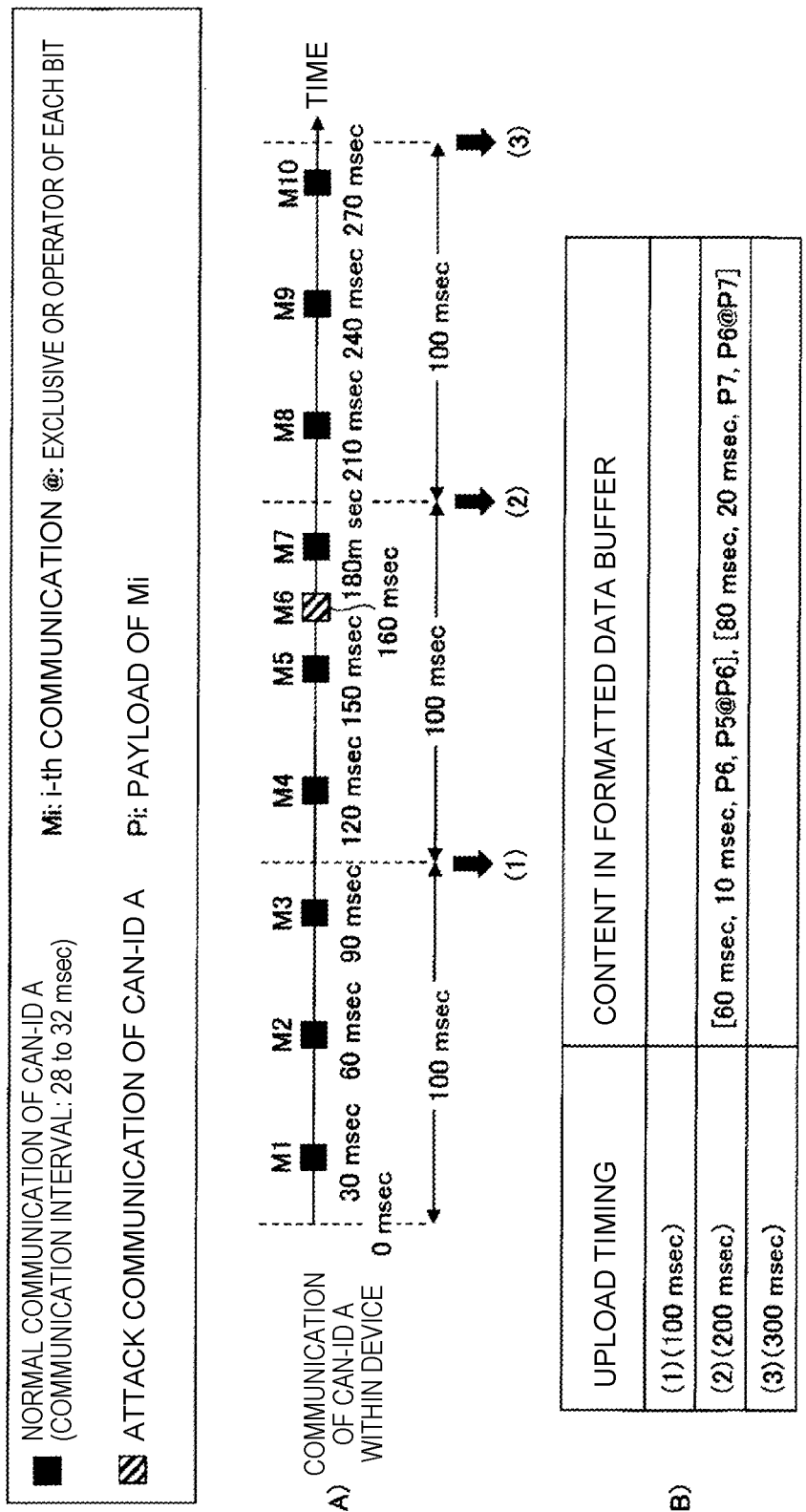
FIG. 6 is a chart for describing data stored in a formatted data buffer 123 at each upload timing according to the first embodiment.

FIG. 6 is a chart for describing the data stored in the formatted data buffer 123 at each upload timing according to the first embodiment. Note that the content of FIG. 6 is not consistent with that of FIG. 5 for the sake of convenience.

In (A) of FIG. 6, communication timings of the CAN data whose CAN-ID is A in the in-device network N2 are indicated on a time axis. It is to be noted herein that the communication interval lower limit of the CAN data whose CAN-ID is A is 28 msec and the communication interval upper limit is 32 msec. Furthermore, it is assumed that the upload period is 100 msec. Therefore, (1), (2), and (3) are the upload timings.

In (A), the conversion data of each CAN data is discriminated by signs of Mx (x=1 to 10). Note that "x" indicates the order of communication. For example, M2 means the second communication. In (A), the interval between M5 and M6 is 10 seconds, which is less than the communication lower limit. Furthermore, the interval between M6 and M7 is 20 seconds, which is less than the communication lower limit. Therefore, M6 and M7 are stored in the formatted data buffer 123.

In (B) of FIG. 6, indicated is the content (converted data of transmission target) of the formatted data buffer 123 at each of the upload timings in a form of [reception time, communication interval, payload, transition] under the communication state of (A). As described above, the targets to be stored in the formatted data buffer 123 are only M6 and M7, so that the converted data is not stored in the formatted data buffer 123 at the timings (1) and (3). In the meantime, at the timing (2) corresponding to M6 and M7, M6 and M7 are stored in the formatted data buffer 123. Note that "reception time" may or may not be initialized to "0" for each upload period. In (B) of FIG. 6, the former case is indicated.

Figure 7:
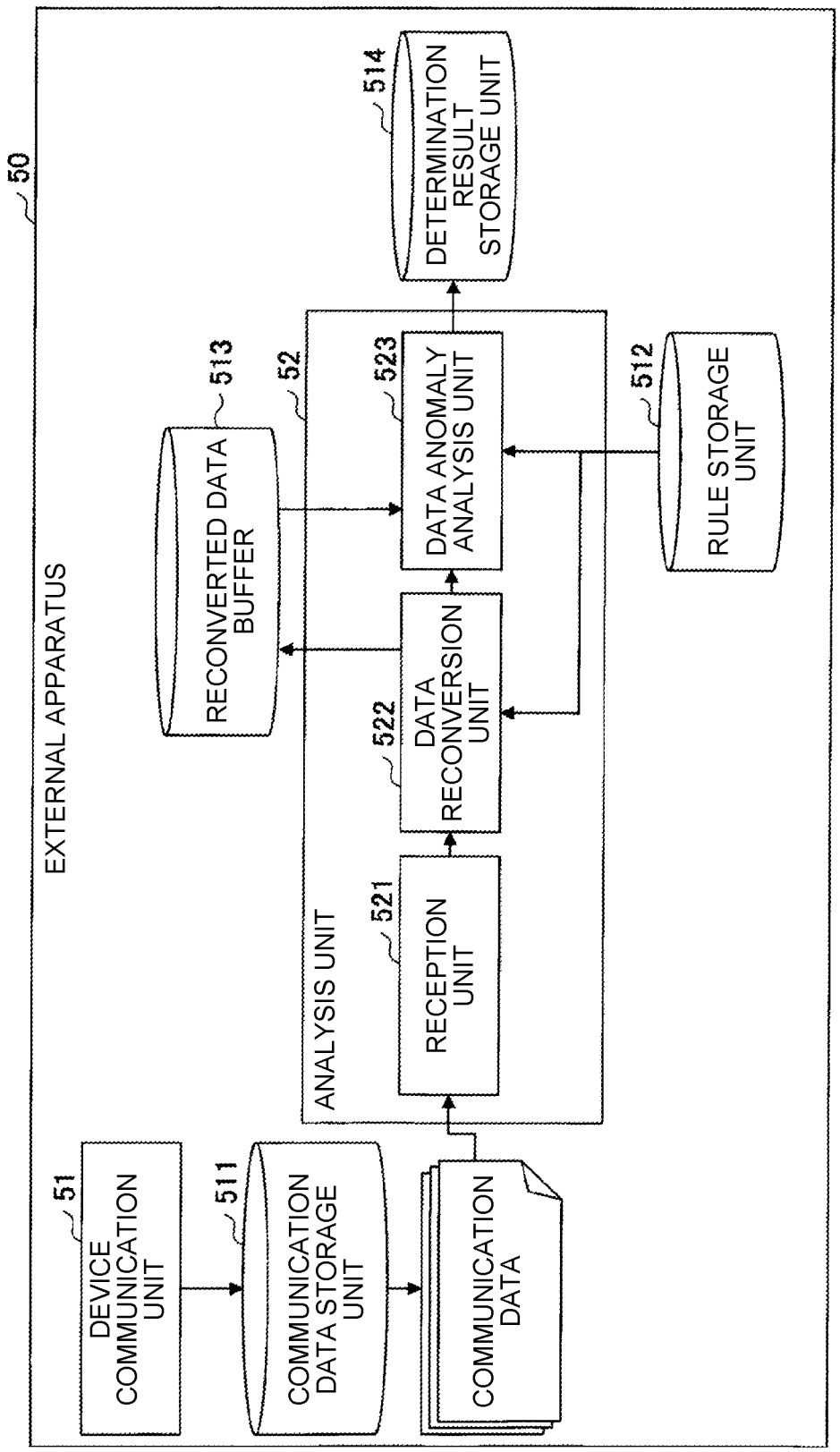
FIG. 7 is a diagram for describing a functional configuration example of an external apparatus 50 and processing executed by the external apparatus 50 according to the first embodiment.

FIG. 7 is a diagram for describing a functional configuration example of the external apparatus 50 and the processing executed by the external apparatus 50 according to the first embodiment. In FIG. 7, the external apparatus 50 includes a device communication unit 51, an analysis unit 52, and the like. The analysis unit 52 includes a reception unit 521, a data reconversion unit 522, a data anomaly analysis unit 523, and the like. Each of those units is implemented by the processing executed by the CPU of the external apparatus 50 by one or more programs installed in the external apparatus 50. The external apparatus 50 also uses storage units such as a communication data storage unit 511, a rule storage unit 512, a reconverted data buffer 513, a determination result storage unit 514, and the like. Each of those storage units can be implemented by using the auxiliary storage device, the memory device, or the like of the external apparatus 50, for example.

Upon receiving the communication data transmitted from the IoT device d1, the device communication unit 51 stores the communication data to the communication data storage unit 511.

The reception unit 521 of the analysis unit 52 checks the communication data storage unit 511 at any time and, when the communication data is stored in the communication data storage unit 511, transmits the communication data to the data reconversion unit 522.

Upon receiving the communication data transmitted from the reception unit 521, the data reconversion unit 522 extracts the rule from the rule storage unit 512. However, the data reconversion unit 522 may also extract the rule in advance only once. Note that the same rules stored in the rule storage unit 122 are stored in the rule storage unit 512. That is, the IoT device d1 and the external apparatus 50 share the same rules.

Then, the data reconversion unit 522 restores or estimates (reconverts) the communication state within the IoT device d1 from the communication data based on the rule, and stores the data that is being reconverted (referred to as "reconverted data" hereinafter) to the reconverted data buffer 513.

Figure 8:
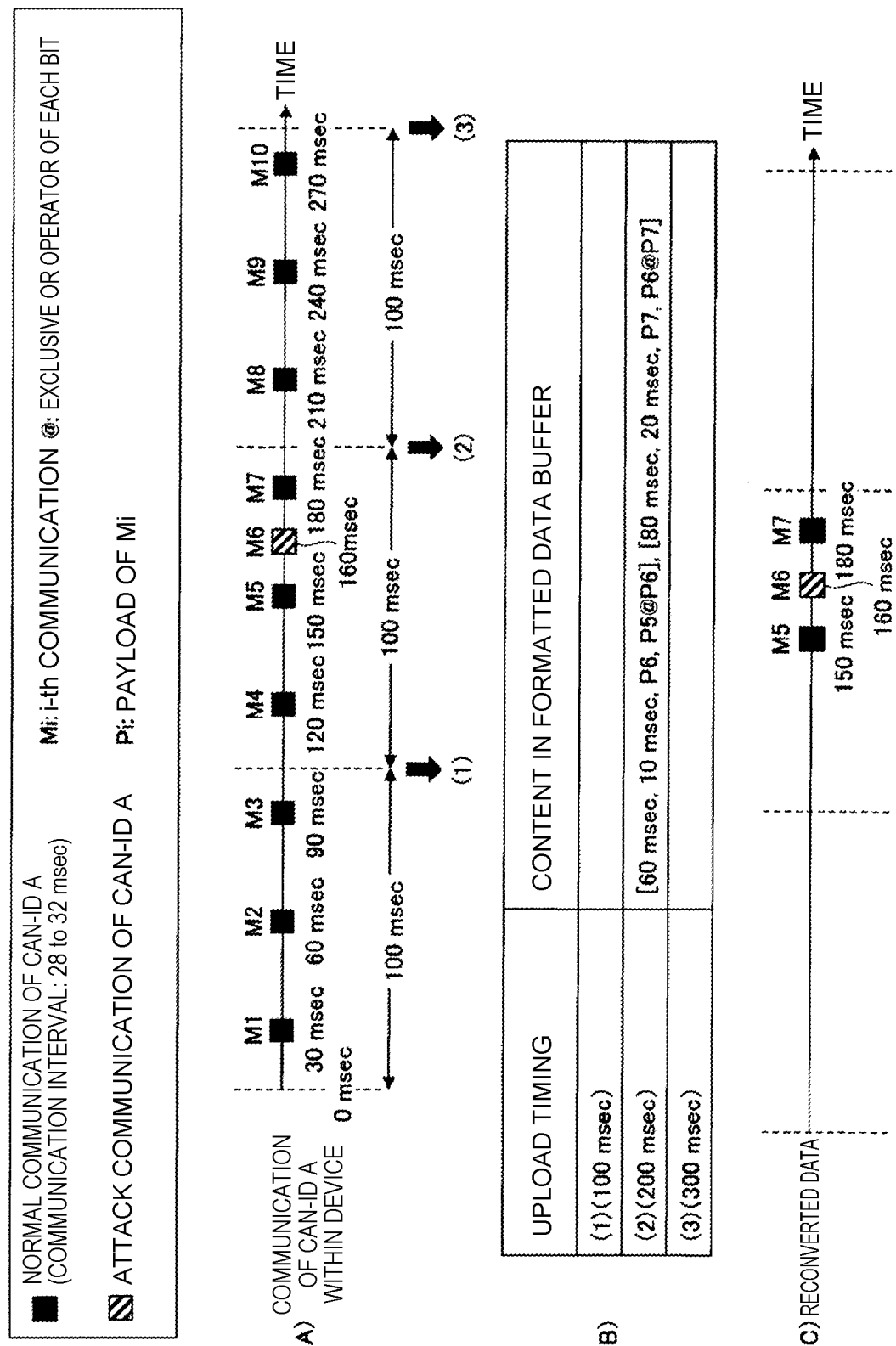
FIG. 8 is a chart illustrating an example of reconverted data according to the first embodiment.

FIG. 8 is a chart illustrating an example of the reconverted data according to the first embodiment. Note that (A) and (B) of FIG. 8 are the same as those of FIG. 6. In (C) of FIG. 8, an example of reconverted data corresponding to FIG. 6 is indicated.

When the content of the formatted data buffer 123 is as it is indicated in (B) of FIG. 6, the communication data includes M6 and M7 indicated in (2) of (B). The data reconversion unit 522 can restore the payload and the communication timing (reception time) of M5 from the converted data. Specifically, the data reconversion unit 522 can restore the reception time of M5 by subtracting the communication interval of M6 from the reception time of M6. Furthermore, the data reconversion unit 522 can acquire a payload P5 of M5 by performing an operation of exclusive OR of the transition of M6 (P5@P6) and a payload P6 of M6 (that is, (P5@P6)@P6). As indicated in the upper section of FIG. 8, "@" means an exclusive OR operator of each bit. When the payload transition is a difference, the data reconversion unit 522 can restore the payload of M5 by adding M6 to the difference (M6−M5) between M5 and M6.

When restoration is completed, the data reconversion unit 522 notifies the data anomaly analysis unit 523 that the restoration is completed.

The data anomaly analysis unit 523 starts processing in response to the notification from the data reconversion unit 522. First, the data anomaly analysis unit 523 extracts the rule from the rule storage unit 512 (may also extract the rule in advance only once and continue to hold it) and, based on the communication intervals of the content (M5, M6, M7) of the reconverted data buffer 513, analyzes and deduces whether there is inconsistency with respect to the reconversion result if any of the communication (converted data) is anomalous so as to determine normal/anomaly of each communication.

In the case of FIG. 8, it is determined as follows. Note that the external apparatus 50 already knows that "CAN-ID: A" is the periodically transmitted communication in a normal state.

Since information of M5 to M7 is reconverted, the data anomaly analysis unit 523 first estimates that at least any one of or a plurality of communications is an attack.

Since M5 itself is not transmitted to the external apparatus 50, the data anomaly analysis unit 523 estimates that M4 is within the range of normal communication interval and specifies the timing of M4 in the range of the normal communication interval. That is, the timing of M4 is specified with a time width (that is, specified as a time zone).

Note that M6 is above the upper limit of the normal communication interval from M4 and is below the lower limit of the normal communication interval from M5. Note that M7 is within the range of the normal communication interval from M5, and is below the lower limit of the normal communication interval from M6.

Since M8 and M9 are not transmitted to the external apparatus 50, the data anomaly analysis unit 523 estimates that the communication intervals between M7 and M8 between M8 and M9 are within the range of the normal interval.

From the above, the data anomaly analysis unit 523 determines that M5 is the normal communication and that one of or both of M6 and M7 are anomalous.

The data anomaly analysis unit 523 determines that M6 is an attack since the communication intervals between M6 and both M5 and M7 are in an anomalous range.

That is, assuming that M7 is an attack, there is normal communication (referred to as "tentative M7" hereinafter) existing between M6 and M7 or between M7 and M8, and the communication interval between the tentative M7 and M7 is below the lower limit of the normal range. While the tentative M7 is therefore supposed to be reconverted, it is not actually reconverted. On the other hand, when M7 as the reconverted data is estimated as the normal communication, there is no confliction with the determination that M5 is normal and M6 is an attack. Therefore, the data anomaly analysis unit 523 determines that M7 is the normal communication.

The data anomaly analysis unit 523 stores the normal/anomaly analysis results of each of M5, M6, and M7 to the determination result storage unit 514. The data anomaly analysis unit 523 may store only the information of M6 determined as anomalous to the determination result storage unit 514 as an attack detection result.

As described above, according to the first embodiment, the IoT device d5 transmits, to the external apparatus 50, not the whole CAN data but the information compressed to be able to identify the highly anomalous communication due to an attack. In the meantime, the external apparatus 50 restores (estimates) strings of CAN data that is not transmitted according to the rule of the compression method, analyses the inconsistency for the estimation, and adds virtual messages without inconsistency in a time series manner. Thereby, the first embodiment enables analysis and detection of anomaly for the time series data of the CAN communication (with missing data in a time series manner) compressed and transmitted to a center. Therefore, it is possible to implement detection of an attack (anomaly) while reducing the traffic load between the IoT device d1 and the external apparatus 50. That is, according to the first embodiment, it is possible to reduce the traffic from the device to the outside while suppressing deterioration in the detection accuracy of unauthorized communication.

Furthermore, compared to the existing techniques, full logs are not necessary so that it is possible to implement analysis and detection of attacks even for the IoT device d1 to which an abundant memory device area cannot be loaded.

Furthermore, compared to the existing techniques, it is possible to implement analysis and detection without loading an anomaly analyzer and detector on the IoT device d1, so that the manufacturing cost, management/maintenance cost, and the like of the IoT device d1 can be reduced.

Furthermore, it is also possible to reduce the collection load (data saving load of database and the like) of the external apparatus 50 that collects the communication data from the IoT device d1.

Moreover, it is also possible to collect information regarding anomalous communication caused due to failures of the ECUs 20 within the IoT device d1 (not due to cyberattacks). Furthermore, when changes in the communication intervals and occurrence of a specific payload transition indicate normal state changes of the ECUs 20, it is also possible to collect information regarding the communication indicating the normal state changes.

Furthermore, by processing the information of the payload and the like included in the communication data, it is possible to reduce leakage of information such as design information of the IoT device d1, current state of the IoT device d1, and the like by wiretapping of the communication path or the like.

Moreover, since the transmission frequency for the external apparatus 50 can be designed arbitrarily with the rule, it is possible to implement both batch and real-time collection modes. Therefore, those who carry out the embodiment can control the balance between reduction of the communication load and readiness of analysis/detection.

Next, a second embodiment will be described. As for the second embodiment, different aspects from those of the first embodiment will be described. Those that are not specifically mentioned in the second embodiment may be considered the same as those of the first embodiment.

In regards to the processing executed by the communication information processing device 10 according to the second embodiment, different points with respect to those of the first embodiment will be described by referring to FIG. 3. In the second embodiment, the processing executed by the transmission data determination unit 13 and the communication data format unit 14 is different.

Upon receiving the converted data from the data conversion unit 12, the transmission data determination unit 13 compares "communication interval lower limit" and "communication interval upper limit" of the target rule with the communication interval of the converted data to determine whether the converted data is the data to be transmitted to the external apparatus 50 (referred to as "determination 1" hereinafter). The transmission data determination unit 13 further determines whether the converted data is the data to be transmitted to the external apparatus 50 (referred to as "determination 2" hereinafter) based on whether the payload transition included in the converted data is 0 (zero) (that is, whether there is a payload transition (change)).

When determined in the determination 1 that the communication interval is out of the range defined by "communication interval lower limit" and "communication interval upper limit" of the target rule (when determined in the determination 1 to be transmitted), when determined in the determination 2 that the payload transition is not zero (when determined in the determination 2 to be transmitted), or when determined both in the determination 1 and the determination 2 to be transmitted, the transmission data determination unit 13 determines that the converted data is to be transmitted to the external apparatus 50. In other cases, the transmission data determination unit 13 determines not to transmit the converted data to the external apparatus 50. For example, when the CAN-ID related to the converted data is "C" and the payload is changed from "0x000A" to "0x0F1A", the second byte is changed from 0A to 1A. Therefore, the transmission data determination unit 13 determines the converted data as a transmission target. In that case, 2 bytes of the latest value "0x0F1A" and the payload transition "0x0F10=0x000A@0x0F1A" are the transmission target ("0x" indicates hexadecimal notation and "@" indicates bitwise exclusive OR).

When determined to transmit the converted data, the transmission data determination unit 13 transmits {CAN-ID, Yes, [latest payload, payload transition]}, for example, to the communication data format unit 14 as the determination result including the converted data. Unlike the first embodiment, the communication interval may not be included. In the meantime, when determined not to transmit the converted data, the transmission data determination unit 13 transmits {CAN-ID, No}, for example, to the communication data format unit 14 as the determination result.

Upon receiving the determination result acquired by the transmission data determination unit 13, the communication data format unit 14 extracts all of the rules from the rule storage unit 122. Note, however, that the communication data format unit 14 may extract the rules in advance only once at the time of startup or the like of the IoT device d1.

Subsequently, the communication data format unit 14 updates the formatted data buffer 123 according to Yes/No of the received determination result. When the determination result is "Yes", the communication data format unit 14 stores the converted data (reception time, communication interval, latest payload, payload transition) included in the determination result to the area corresponding to the target CAN-ID in the formatted data buffer 123. In the meantime, when the determination result is "No", the communication data format unit 14 does not store the converted data to the formatted data buffer 123.

Note that the formatted data buffer 123 of the second embodiment includes a counter for each CAN-ID, and the communication data format unit 14 increments the counter of the CAN-ID that corresponds to the determination result every time the determination result is received. Therefore, even when the converted data is not stored in the formatted data buffer 123, the counter is updated.

When storing the converted data, the communication data format unit 14 stores the converted data to the formatted data buffer 123 while giving the value of the counter of the CAN-ID corresponding to the converted data at that point. When the converted data corresponding to the CAN-ID is already stored in the formatted data buffer 123, the communication data format unit 14 does not store "latest payload" of the converted data as the storing target to the formatted data buffer 123.

Every time the timing of "upload period" included in each of the rules comes, the communication data format unit 14 transmits, to the data transmission unit 15, the content in the buffer areas of the formatted data buffer 123 corresponding to all of the CAN-IDs corresponding to the timing as the communication data. Then, the communication data format unit 14 deletes the converted data included in the communication data from the formatted data buffer 123.

FIG. 9 is a chart illustrating an example of the communication data according to the second embodiment. In FIG. 9, three kinds of CAN-IDs (A, B, C) are the monitoring target, and presented therein is an example of the communication data in a case where the number of times the converted data to be transmitted is generated is "10" in "A", "3" in "B", and "1" in "C", respectively, at the timing where 100 msec has passed from the previous transmission. Furthermore, it is also indicated that the payload is changed twice in "A" and once in "C".

The processing executed by the data transmission unit 15 in the second embodiment may be the same as that of the first embodiment.

Figure 10:
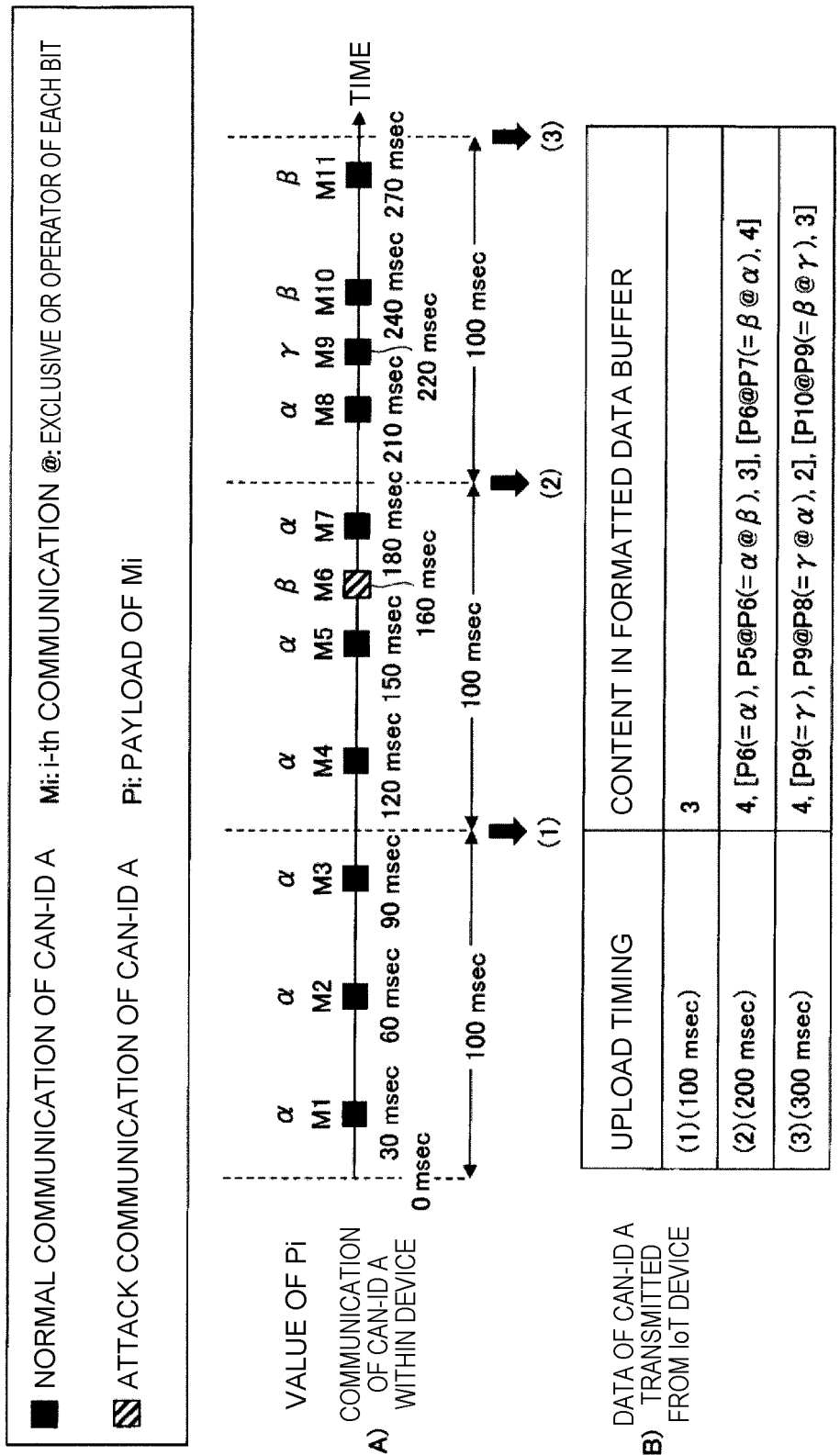
FIG. 10 is a chart for describing data stored in the formatted data buffer 123 at each upload timing according to the second embodiment.

FIG. 10 is a chart for describing the data stored in the formatted data buffer 123 at each upload timing according to the second embodiment. Note that the content of FIG. 10 is not consistent with that of FIG. 9 for the sake of convenience.

FIG. 10 can be read in the same manner as that of FIG. 6. Furthermore, the conditions such as the upper limit and lower limit of communication interval and the like are also the same as those of FIG. 6. In the meantime, in (A) of FIG. 10, values of the payloads (values of Pi) included in each of the calculation results are indicated by signs such as a, p, y, or the like. The same sign means that the payloads are the same.

In (1), the payloads of M5 and M6 are different (that is, transition is not 0). Furthermore, the payloads of M6 and M7 are also different. Therefore, M6 and M7 are stored in the formatted data buffer 123. Considering the upper limit of the communication intervals, M6 and M7 are also stored in the formatted data buffer 123. Furthermore, the interval between M8 and M9 is 10 seconds, which is less than the communication interval lower limit. Moreover, the interval between M9 and M10 is 20 seconds, which is less than the communication interval lower limit. Therefore, M9 and M10 are also stored in the formatted data buffer 123.

In (B) of FIG. 10, indicated is the content (converted data of transmission target) of the formatted data buffer 123 at each of the upload timings in a form of [counter, each converted data] under the communication state of (A). Each converted data is indicated in a form of [payload, transition, counter] or [transition, counter]. As described above, the targets to be stored in the formatted data buffer 123 are M6 and M7 as well as M9 and M10. Therefore, M6 and M7 are stored in the formatted data buffer 123 at the timing (2), and M9 and M10 are stored in the formatted data buffer 123 at the timing (3). Note that it can be found from the values of the counter that the determination result is received 3 times in the period of (1), the determination result is received 4 times in the period of (2), and the determination result is received 4 times in the period of (3) by the communication data format unit 14.

Next, in regards to the processing executed by the external apparatus 50 of the second embodiment, different points with respect to those of the first embodiment will be described by referring to FIG. 7.

In the second embodiment, the processing executed by the data reconversion unit 522 and the data anomaly analysis unit 523 is different from that of the first embodiment.

Specifically, the data reconversion unit 522 restores (reconverts) the communication state within the IoT device d1 from the communication data based on the rule, and stores the reconverted data that has been reconverted to the reconverted data buffer 513.

Figure 11:
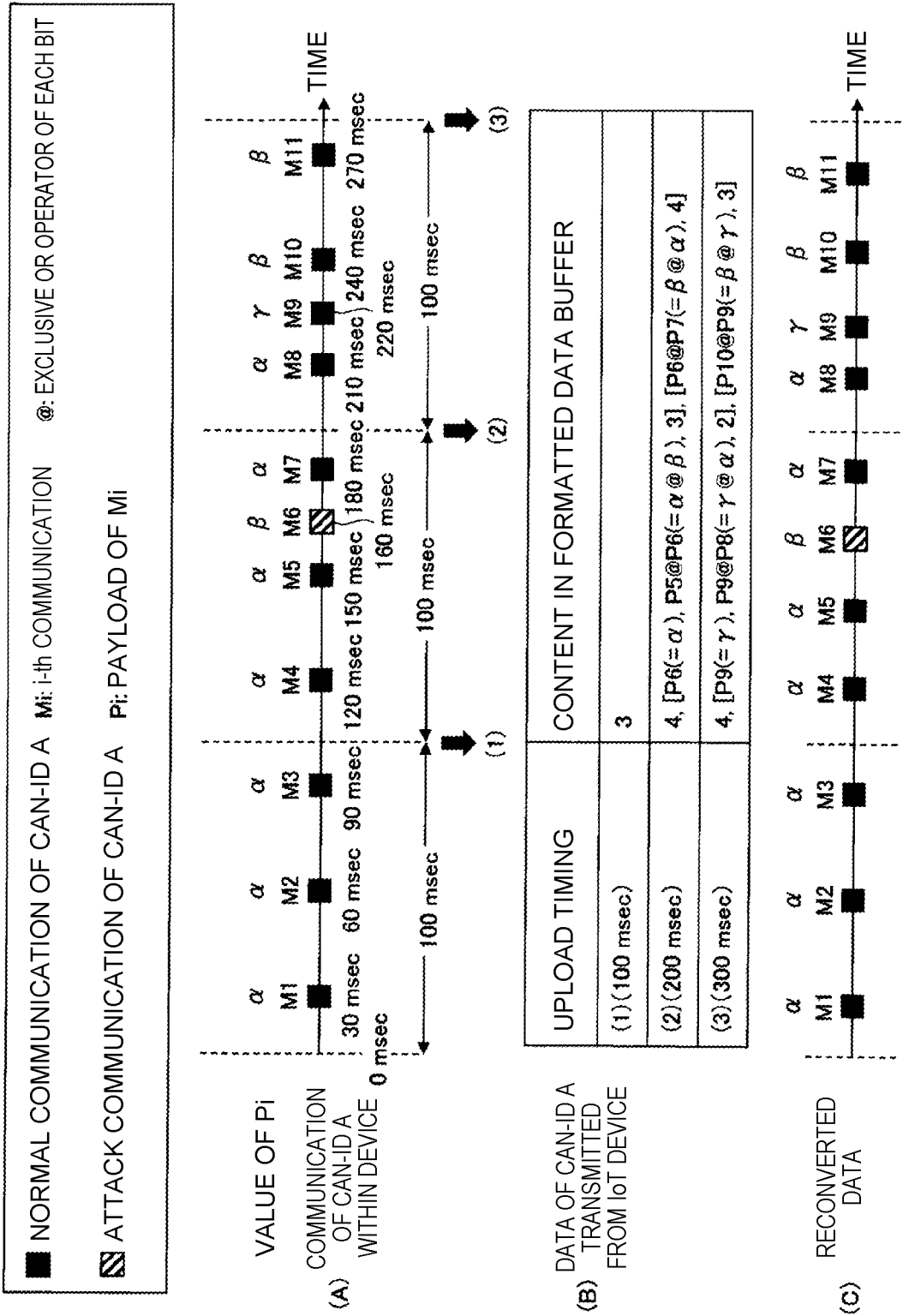
FIG. 11 is a chart illustrating an example of reconverted data according to the second embodiment.

FIG. 11 is a chart illustrating an example of the reconverted data according to the second embodiment. In (C) of FIG. 11, indicated is an example of the reconverted data corresponding to FIG. 10.

When the content of the formatted data buffer 123 is as it is indicated in (B) of FIG. 10, the communication data at the timing (1) includes only the counter, the communication data at the timing (2) includes the counter, M6 and M7, and the communication data at the timing (3) includes the counter, M9 and M10. The data reconversion unit 522 can restore the communication transitions of M1 to M11 from such data. First, it is the same as the case of the first embodiment that M5 can be restored from M6. Furthermore, M4 can be restored based on M5. Note that M4 is not transmitted because the communication interval with respect to M5 is within the normal range and the payload is the same as that of M5. Furthermore, since the counter at the timing (2) is "4", there are supposed to be four calculation results. Therefore, M5 that has the same payload and the communication interval thereof from M5 is within the normal range is restored. Similarly, M1 to M3 are also restored based on M5. Furthermore, M8 is restored based on M9 in the same method as that used when restoring M5 from M6. Furthermore, since the counter at the timing (3) is "4", there is supposed to be the converted data before M8 or after M10. According to the communication interval, it can be also found that M11 exists within the range of normal communication interval from M10 and that the payload of M11 is the same as that of M10.

When restoration is completed, the data reconversion unit 522 notifies the data anomaly analysis unit 523 that the restoration is completed.

The data anomaly analysis unit 523 starts processing in response to the notification from the data reconversion unit 522. First, the data anomaly analysis unit 523 extracts the rule from the rule storage unit 512 (may also extract the rule in advance only once and continue to hold it) and, based on the communication intervals of the content (M1 to M11) of the reconverted data buffer 513 and the normal transition patterns stored in advance, analyzes and deduces whether there is inconsistency with respect to the reconversion result if any of the communication (converted data) is normal or anomalous so as to determine normal/anomaly of each communication.

In the case of FIG. 11, it is determined as follows. For the CAN-ID "A", as the normal transition patterns of payloads, it is assumed that patterns such as "there is a case where the value does not change, the value changes to β only from γ, the value changes to γ both from α and β", for example, are defined as normal patterns. Those patterns vary depending on the IoT device d1, so that the normal transition patterns may be set by arbitrary methods.

In that case, the transition pattern of M6 does not correspond to the normal transition patterns, so that the data anomaly analysis unit 523 determines M6 as an attack and other communications as normal.

The data anomaly analysis unit 523 stores the normal/anomaly analysis results of M1 to M11 to the determination result storage unit 514. Note that the data anomaly analysis unit 523 may store only the information of M6 determined as anomalous to the determination result storage unit 514 as an attack detection result.

As described above, it is also possible with the second embodiment to acquire the same effect as that of the first embodiment.

Next, a third embodiment will be described. As for the third embodiment, different aspects from those of the second embodiment will be described. Those that are not specifically mentioned in the third embodiment may be considered the same as those of the first embodiment.

In the third embodiment, a part of the processing of the transmission data determination unit 13 is different from that of the second embodiment. Specifically, the transmission data determination unit 13 in the third embodiment determines to transmit the converted data to the external apparatus 50 when the communication interval is out of the range defined by "communication interval lower limit" and "communication interval upper limit" of the target rule in the determination 1 and when the payload transition is not zero in the determination 2. In other cases, the transmission data determination unit 13 determines not to transmit the converted data to the external apparatus 50.

The processing executed by the communication information processing device 10 may be the same as that of the second embodiment except for the point described above.

Next, in regards to the processing executed by the external apparatus 50 according to the third embodiment, different points with respect to those of the second embodiment will be described by referring to FIG. 7.

In the third embodiment, the processing executed by the data anomaly analysis unit 523 is different from that of the second embodiment. That is, in the third embodiment, received is the communication data whose communication interval is out of the range of threshold values and whose payload transition is not 0. Therefore, an anomaly is detected by considering both communication interval and payload transition.

In the case of FIG. 11, anomaly detection is performed as follows. For the CAN-ID "A", as the normal transition patterns of payloads, patterns such as "the communication interval is within the range of upper and lower limits when the payload is unchanged, the value changes from γ to β only when the communication interval is lower than the lower limit, the value changes to γ both from α and β", for example, are defined as normal patterns.

In that case, the communication data M6 is deviated from the communication interval and the transition patterns, so that the data anomaly analysis unit 523 determines that the communication data M6 is an attack and other communications as normal.

The other points may be the same as those of the second embodiment.

Note that the first, second, and third embodiments may be applied separately for each CAN-ID. In that case, an item may be added regarding which of the conditions of the rules may be applied for determining whether to transmit or not by each of the CAN-IDs.

In the case of the first embodiment, the communication data regarding the communication on the in-device network N2 in the section (each time zone sectioned by the upload period) where only the normal communication takes place is not transmitted to the external apparatus 50, so that it is possible to detect the attack in the manner described above while reducing the traffic between the IoT device d1 and the external apparatus 50.

In the case of the second and third embodiments, the communication data of a part of communications that meet the conditions is transmitted to the external apparatus 50 and the payload transition of the communication data that is not transmitted can also be restored from the transmitted communication data, so that it is possible to detect the attack in the manner described above while reducing the traffic between the IoT device d1 and the external apparatus 50.

Next, a fourth embodiment will be described. As for the fourth embodiment, different aspects from those of each of the embodiments will be described. Those that are not specifically mentioned in the fourth embodiment may be considered the same as those of each of the embodiments described above.

In the first to third embodiments, there may be a case where the communication patterns of the ECUs 20 change due to update of the functions, chronological changes, and the like of the ECUs 20, and a vast amount of communication data related to the communication not under a cyberattack may be transmitted to the external apparatus 50.

Therefore, in the fourth embodiment, described is an example that is capable of avoiding transmission of the communication data related to normal communication by making it possible to update the rules.

Figure 12:
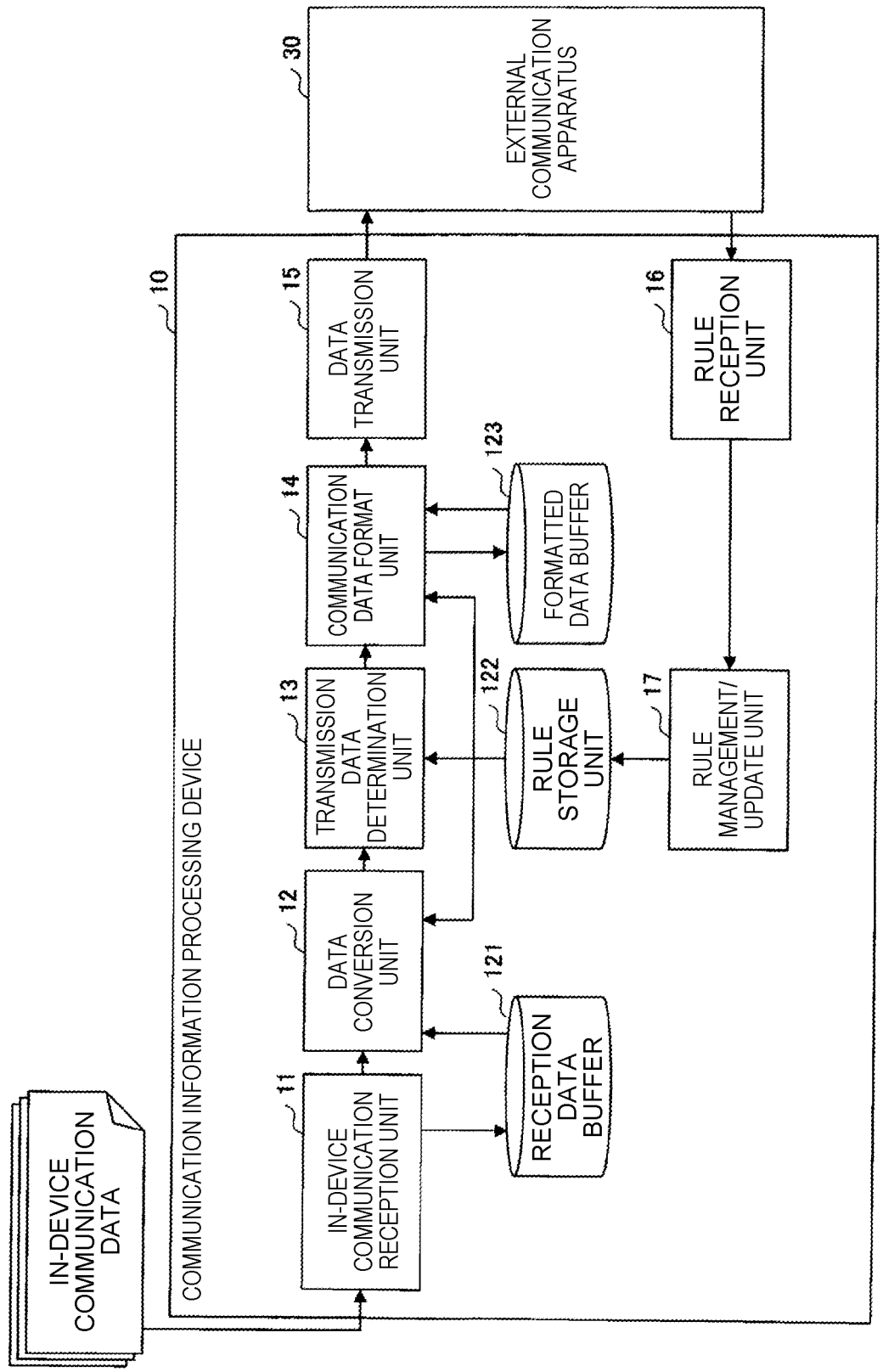
FIG. 12 is a diagram for describing a functional configuration example of the communication information processing device 10 and processing executed by the communication information processing device 10 according to a fourth embodiment.

FIG. 12 is a diagram for describing a functional configuration example of the communication information processing device 10 and the processing executed by the communication information processing device 10 according to the fourth embodiment. In FIG. 12, same reference signs are applied to the components same or corresponding to those of FIG. 3, and explanations thereof are omitted as appropriate.

In FIG. 12, the communication information processing device 10 further includes a rule reception unit 16 and a rule management/update unit 17. Each of those units is implemented by the processing executed by the CPU 103 by one or more programs installed in the communication information processing device 10.

Figure 13:
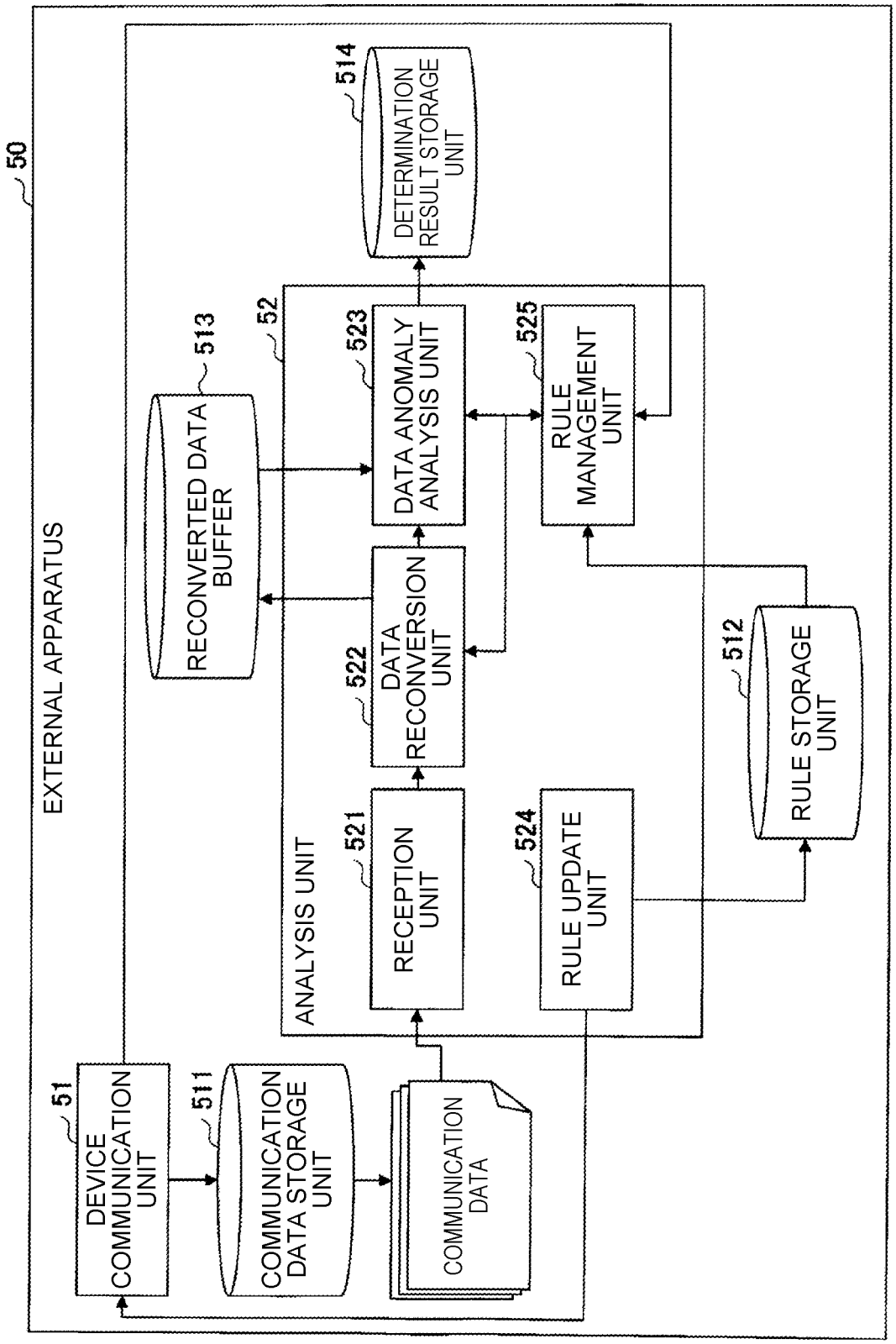
FIG. 13 is a diagram for describing a functional configuration example of the external apparatus 50 and processing executed by the external apparatus 50 according to the fourth embodiment.

FIG. 13 is a diagram for describing a functional configuration example of the external apparatus 50 and the processing executed by the external apparatus 50 according to the fourth embodiment. In FIG. 13, same reference signs are applied to the components same or corresponding to those of FIG. 7, and explanations thereof are omitted as appropriate.

In FIG. 13, the analysis unit 52 of the external apparatus 50 further includes a rule update unit 524 and a rule management unit 525.

In the fourth embodiment, update and management of the rules are implemented in a following order.

For example, the administrator of the communication system 1 inputs a rule update instruction and an updated rule to the rule update unit 524 of the external apparatus 50 based on the occurrence of functional update of the ECUs 20 and the verification result of the content of the determination result storage unit 514. The rules may be input via the network.

The rule management/update unit 17 stores the input new rule (referred to as "new rule" hereinafter) to the rule storage unit 512, and transmits the new rule to the device communication unit 51.

The device communication unit 51 transmits the new rule to the rule reception unit 16 through the external communication apparatus 30. Upon receiving the new rule, the rule reception unit 16 transmits the new rule to the rule management/update unit 17 of the communication information processing device 10.

The rule management/update unit 17 stores the new rule to the rule storage unit 122 and also transmits, to the data transmission unit 15, the timing information (information of date/time and the like) at which storing is completed. The data transmission unit 15 transmits the timing information to the rule management unit 525 of the external apparatus 50 via the external communication apparatus 30.

The rule management unit 525 manages data of which period the new and old rules in the rule storage unit 512 are applied, and manages the analysis unit 52 to apply the proper rule for the data. This makes it possible to appropriately perform restoration of data, analysis of anomaly, and the like, for example.

Next, a fifth embodiment will be described. As for the fifth embodiment, different aspects from those of the fourth embodiment will be described. Those that are not specifically mentioned in the fifth embodiment may be considered the same as those of the fourth embodiment.

In the first to third embodiments, there may be an implementation mode where the communication pattern changes in accordance with the states of the IoT device d1 (for example, a state where all functions can be operated since a stable power source can be secured, a state where the functions are degenerated to be operated since the battery level is low, a running state or stop state when it is a case of vehicle, and the like). Therefore, in the fifth embodiment, described is an example where the rules are dynamically switched in accordance with the state of the IoT device d1.

It is assumed that the rule management/update unit 17 of the communication information processing device 10 is implemented to be able to discriminate the states of the IoT device d1. Furthermore, the rule storage unit 122 and the rule storage unit 512 have the configuration capable of storing the rules by each of the states of the IoT device d1. For example, if the rules are to be changed for each of three states S1, S2, and S3, the rule as in FIG. 4 is stored in the rule storage unit 122 and the rule storage unit 512 for each of the states S1, S2, and S3.

Among the rules stored in the rule storage unit 122, the rule management/update unit 17 activates the rule corresponding to the current state of the IoT device d1. For example, a label "main rule" may be given to that rule. Hereinafter, the activated rule is referred to as "main rule".

In the fifth embodiment, it is assumed that the data conversion unit 12, the transmission data determination unit 13, and the communication data format unit 14 extract the main rule. Furthermore, in a case of employing an implementation mode where each of the units extracts the rules in advance only once at the time of startup or the like of the IoT device d1, the rule management/update unit 17 may notify the change of the main rule to each of the units to instruct re-extraction of the main rule.

When storing the communication data to the formatted data buffer 123, the communication data format unit 14 gives, to the converted data, information indicating which rule is applied thereto (referred to as "application information" hereinafter). For example, information indicating the state of the IoT device d1 may be given to the converted data as the application information.

The data reconversion unit 522 of the external apparatus 50 notifies the rule management unit 525 of the application information given to the converted data included in the received communication data.

The rule management unit 525 extracts the rule corresponding to the application information from the rule storage unit 512, and transmits the rule to the data reconversion unit 522 and the data anomaly analysis unit 523.

The data reconversion unit 522 and the data anomaly analysis unit 523 use the received rule to execute the processing described in the first to third embodiments.

In the embodiments, the IoT device d1 is an example of the communication device. The data conversion unit 12 is an example of the calculation unit. The transmission data determination unit 13 is an example of the determination unit. The data transmission unit 15 is an example of the transmission unit. The data reconversion unit 522 is an example of the estimation unit. The data anomaly analysis unit 523 is an example of the detection unit.

While the embodiments of the present invention are described above in detail, the present invention is not limited by the specific embodiments. Various modifications and changes are possible without departing from the scope of the present invention described in the appended claims.

REFERENCE SIGNS LIST

1 Communication system
10 Communication information processing device
11 In-device communication reception unit
12 Data conversion unit
13 Transmission data determination unit
14 Communication data format unit
15 Data transmission unit
16 Rule reception unit
17 Rule management/update unit
20 ECU
30 External communication apparatus
50 External apparatus
51 Device communication unit
52 Analysis unit
101 Auxiliary storage device
102 Memory device
103 CPU
104 Interface device
121 Reception data buffer
122 Rule storage unit
123 Formatted data buffer
511 Communication data storage unit
512 Rule storage unit
513 Reconverted data buffer
514 Determination result storage unit
521 Reception unit
522 Data reconversion unit
523 Data anomaly analysis unit
524 Rule update unit
525 Rule management unit
B Bus
d1 IoT device
N1 External network
N2 In-device network

The invention claimed is:

1. A communication apparatus communicating with an external apparatus connected via a network, the communication apparatus comprising:
a processor; and
a memory storing program instructions that cause the processor to:
calculate a communication interval of data communicated within the communication apparatus;
determine whether to perform communication with the external apparatus based on whether the communication interval is within a range set in advance; and
transmit, to the external apparatus, communication data including the communication interval determined to perform communication with the external apparatus, latter data in the communication interval, and a transition between former data and the latter data in the communication interval.

2. The communication apparatus according to claim 1, wherein the transition is an exclusive OR difference between the former data and the latter data in a bit unit.

3. The communication apparatus according to claim 1, wherein:
the processor further determines whether to perform communication with the external apparatus based on presence or absence of the transition; and transmits, to the external apparatus, communication data including the transition determined to perform communication with the external apparatus, a communication interval related to the transition, and latter data in the communication interval.

4. The communication apparatus according to claim 3, wherein, for a specific period, the processor transmits, to the external apparatus, a number of times of determination in the specific period.

5. The communication apparatus according to claim 1, wherein the processor transmits, to the external apparatus, communication data including a part of the latter data.

6. The communication apparatus according to claim 1, wherein the external apparatus is further configured to execute operations comprising:
   estimating, based on communication data transmitted from the communication apparatus, data communicated within the communication apparatus and not included in the communication data; and
   detecting unauthorized communication within the communication apparatus based on data included in the communication data and the estimated data.

7. A communication system comprising the communication apparatus of claim 1, wherein the external apparatus is further configured to execute operations comprising:
   estimating, based on the communication data transmitted from the communication apparatus, data communicated within the communication apparatus and not included in the communication data; and
   detecting unauthorized communication within the communication apparatus based on data included in the communication data and the estimated data.

8. A non-transitory computer-readable storage medium that stores therein a program causing a computer including a memory and a processor to operate as the communication apparatus according to claim 1.

9. A communication method executed by a communication apparatus communicating with an external apparatus connected via a network, the communication method comprising:
   calculating a communication interval of data communicated within the communication apparatus;
   determining whether to perform communication with the external apparatus based on whether the communication interval is within a range set in advance; and
   transmitting, to the external apparatus, communication data including the communication interval determined to perform communication with the external apparatus, latter data in the communication interval, and a transition between former data and the latter data in the communication interval.

* * * * *